United States Patent Office 3,111,469
Patented Nov. 19, 1963

3,111,469
PREPARATION OF POLY-BETA-PROPIOLACTONE
Nelson S. Marans, Adelphi, Md., assignor to W. R. Grace & Co., a corporation of Connecticut
No Drawing. Filed Apr. 5, 1961, Ser. No. 100,812
4 Claims. (Cl. 204—154)

The present invention relates to high molecular weight polymers produced from beta-propiolactone, and more specifically to a novel method for polymerizing beta-propiolactone into polymers having improved physical properties.

It is generally known that when monomeric beta-propiolactone is subjected to elevated temperatures while in the liquid state, ring opening occurs and polymerization will proceed to yield low molecular weight and generally low melting polymers. The reaction which beta-propiolactone undergoes during polymerization may be illustrated as follows:

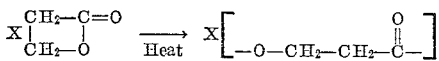

and

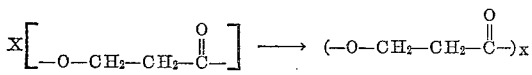

As illustrated above, the polymer obtained in the polymerization of beta-propiolactone may be described as a polyester, or more specifically, as a linear polyester since polymerization occurs in a linear fashion.

While the prior art reveals that treatment of beta-propiolactone in the liquid phase by conventional thermo-polymerization techniques, i.e. heating, produces a certain degree of polymerization, the polymers obtained by this practice possess low melting points and exceedingly poor film forming or molding characteristics. Hence, the polymers thus far obtained from beta-propiolactone have found few useful commercial applications. Attempts to remedy these short-comings by extending the duration or severity of the polymerization conditions used with beta-propiolactone have thus far failed to produce a satisfactory or commercially useful polymer from this potentially valuable monomer.

It is therefore an object of the present invention to provide a beta-propiolactone polymer which possesses a relatively high melting point and good molding characteristics.

It is another object of the present invention to provide a method for polymerizing beta-propiolactone which yields a crystalline polyester having improved physical qualities.

These and still further objects of the present invention will become obvious to one skilled in the art from the following detailed description and examples.

In general, the present invention contemplates a method for polymerizaing beta-propiolactone which involves the irradiation of monomeric beta-propiolactone maintained in the solid state.

More specifically, in the practice of the present invention monomeric beta propiolactone is frozen at temperatures below its melting point of —33.4° C., and while being maintained in an inert atmosphere or vacuum, is subjected to high energy irradiation. The efficiency of the polymerization and the physical characteristics of the polymer obtained is generally dependent upon the total irradiation dosage used, the rate at which the dosage is applied, and the treatment of the polymer subsequent to irradiation.

In general, the total irradiation dosages as low as 0.01 mr. (megarads) have been found to produce certain amounts of polymerization; however, to produce a substantial amounts of polymer in a given sample of monomeric beta-propiolactone irradiation dosages in the range of from about 0.1 to about 1.0 mr. are generally used. Irradiation dosages in this range (0.1 to 1.0 mr.) have been found to produce from about 6% to about 35% polymer in a given amount of monomer. Irradiation dosages in excess of 1.0 mr. and up to about 10 mr. may be used. However, it is found that at the higher dosages, i.e., 1.0 to 10 mr., while an increased total amount of polymerized material is obtained from an increased amount of irradiation, the molecular weight of the resultant polymers tend to decrease with increased irradiation dosage. This may be attributed to the fact that at higher dosages of irradiation, a greater number of activated polymerization sites are obtained than at lower dosages, and these sites are limited in their growth by the amount of monomer immediately available for polymerization. Hence, it is generally found that maximum chain-growth occurs when the number of activated polymerization sites does not exceed that number for which adequate amounts of monomer are immediately available for chain-growth.

In the case of beta-propiolactone it is found that maximum chain-growth is obtained when the irradiation dose is held below 1.0 mr. preferably in the range of 0.03 to 0.6 mr. It will be shown that by regulating the total irradiation dosage delivered, polymers having a variety of molecular weights and melting points may conveniently be obtained.

An upper limit of about 10 mr. may be generally assigned to processes operating at commercially feasible freezing temperatures, i.e. in the range of —40 to —60° C. While operating in this temperature range, it is found that irradiation dosages in excess of about 10 mr. leads to excessive heat buildup in the frozen monomer which in turn leads to melting of the monomer and the production of inferior products.

The total dosage applied to the monomer may be applied in one dose or it may be advantageously applied in increments. In general, it is found that by applying a given dosage in increments an increase in the overall molecular weight of the product is obtained as compared to a product which has received the same dosage in a single dose. This appears to be due to the fact that the series of increment dosages appear to create initially fewer active polymerization sites which in turn permits greater chain-growth of these few sites.

After the monomer sample is irradiated the excess monomer can be removed by any convenient means. In many cases, a monomer may be conveniently removed by filtration or by evaporation at room temperature or at elevated temperatures under reduced pressure if desired. However, it should be noted that temperatures used in evaporating the monomer should not exceed the temperature at which thermal-polymerization of the monomer takes place. It has also been found that immediate removal of the excess monomer after irradiation reduces the chance of thermal-polymerization which occurs to some extent even at room temperature.

The polymers obtained as a result of the present process possess a melting range from about 65 to about 120° C. and are found to possess reduced specific viscosities or from about 0.32 to about 3.0 dlg.$^{-1}$ as determined by a method in which 0.1 g. of polymer is dissolved in 100 ml. of symmetrical tetrachloroethane at 100° C. Infrared analysis of the polymer indicates that a polyester is obtained, and X-ray examination indicates a generally crystalline structure is present.

The irradiation used to induce polymerization of the beta-propiolactone in the solid state may be high energy electrons such as produced by a Van de Graaff generator or a resonance transformer; X-rays such as produced by a radioactive precursor such as cobalt 60; or ionizing neutrons, protons, alpha-particles or deuterons.

Having generally described the present invention the following examples are given to illustrate specific embodiments of the invention.

*Example I*

Beta-propiolactone was fractionated in a 10 plate distillation column, and a sample having a boiling point of 49 to 50° C. at 10 mm. Hg pressure, and a refractive index of 1.4109 to 1.4110 at 25° C. was obtained. A series of 2 g. samples of this product were tared into aluminum cups 2 inches in diameter. The aluminum cups were sparged with nitrogen and then covered with 1 mil aluminum foil. Irradiations were then conducted in a large copper covered aluminum 25 x 15 cm. cell through which nitrogen was flowing at a rate of 1 liter per minute. Temperature control was achieved by cooling an aluminum plate upon which the cell was mounted. The plate was cooled to −50° by passing methanol, cooled in a Dry Ice-acetone bath, through holes in the metal plate. The temperature of the aluminum cell containing the monomer was maintained at −40° C. The samples were then irradiated with 2 mev. electrons from a Van de Graaff generator to a dosage of 0.1 mr. delivered in a single pass, a single pass requiring a period of 6 minutes in each case. The resultant polymer was separated from the excess monomer by filtration at room temperature and the following characteristics were determined:

| Sample | Percent Conversion (by weight) | RSV (red. spec. vis.) | M.P. (° C.) |
|---|---|---|---|
| A | 9.5 | 1.71 | 106–112 |
| B | 6.2 | 2.00 | 105–111 |
| C | 7.8 | 1.40 | 106–110 |
| D | 5.3 | 1.53 | 105–109 |
| E | 4.4 | 2.56 | 108–115 |

*Example II*

Samples of beta-propiolactone monomer used in Example I were first frozen in liquid nitrogen and then irradiated in a manner defined in Example I. The following results were obtained:

| Sample | Percent Conversion (by weight) | RSV | M.P. (° C.) |
|---|---|---|---|
| A | 4.4 | 1.74 | 105–109 |
| B | 3.8 | 1.68 | 108–112 |
| C | 5.3 | 1.79 | 109–114 |
| D | 2.0 | 1.91 | 110–115 |
| E | 3.1 | 1.66 | 109–112 |
| F | 3.4 | 1.70 | 109–112 |

*Example III*

In order to show the variation in polymers obtained by varying the dosage rate, tests were run using monomer samples and conditions similar to that defined in Example I in which a 1.0 mr. dosage was delivered first in a series of 0.1 mr. passes, then in a series of 0.25 mr. passes, and finally in a single pass of 1.0 mr., wherein each pass required a period of 6 minutes. A sample irradiated to only 0.1 mr. was also run for comparison. The following results were obtained:

| Dosage (mr.) | Percent Conversion | RSV | M.P. (° C.) |
|---|---|---|---|
| 1.0 at 0.1 mr./pass | 5.7 | 0.73 | 97–100 |
| 1.0 at 0.25 mr./pass | 6.5 | 0.54 | 93–96 |
| 1.0 at 1.0 mr./pass | 3.9 | 0.26 | 80–82 |
| 0.1 at 0.1 mr./pass | 3.1 | 0.98 | 96–100 |

It is seen from the above that as the number of passes decreases, i.e. the dosage rate increases, the melting point of the polymer decreases as does the specific viscosity.

*Example IV*

To illustrate the improvement of the polymers obtained by irradiation in the solid state as opposed to those obtained by polymerization in the liquid state, the following tests were run in which samples of beta-propiolactone identical to those used in Example I were subjected to varying irradiation dosages at 25° C. The following results were obtained:

| Dosage (mr.) | Percent Polymer | RSV | M.P. (° C.) |
|---|---|---|---|
| 1.0 at 0.1 mr./pass | 0.8 | Liquid | Liquid. |
| 1.0 at 0.25 mr./pass | 0.8 | do | Do. |
| 1.0 at 0.1 mr./pass | 1.2 | do | Do. |

In the above, it is found that by carrying out the irradiation liquid phase only a fraction of the total polymerization observed in the solid phase is obtained. It is also noted that no sample was obtained for which a melting point or RSV determination could be obtained.

*Example V*

To illustrate the physical properties of the polymer obtained in the practice of the present invention, three batches of beta-propiolactone polymer having varying reduced specific viscosities were subjected to tests in which tensile strength, tensile modulus, stress at yield, elongation at yield, and elongation at failure were determined. For three samples the results listed below were obtained:

| | Sample I | Sample II | Sample III |
|---|---|---|---|
| RSV (dlg.⁻¹) | 0.40 | 0.64 | 1.20 |
| Tensile Strength (p.s.i.) | $3.8$–$4.1 \times 10^3$ | $6.8$–$8.2 \times 10^3$ | $4.2$–$4.3 \times 10^3$ |
| Tensile Modulus (p.s.i.) | $184$–$187 \times 10^3$ | $203$–$320 \times 10^3$ | $167$–$191 \times 10^3$ |
| Stress at Yield (p.s.i.) | $4.4$–$4.6 \times 10^3$ | $3.9$–$4.1 \times 10^3$ | $4.4$–$4.6 \times 10^3$ |
| Elongation at yield, percent | 6.4–7.0 | 6.5–7.5 | 7.3–8.3 |
| Elongation at failure, percent | 270–470 | 500–660 | 10.1–11.6 |

Polymeric materials practiced in the present invention are found to possess good film forming characteristics and possess a low permeability to oxygen. Thus, it is seen, the present polymers find application as films for packaging materials and so forth.

I claim:

1. A method for producing beta-propiolactone polymers which comprises: cooling substantially monomeric beta-propiolactone to below its freezing point, subjecting said frozen beta-propiolactone to high energy ionizing irradiation to induce polymerization therein, and removing the unpolymerized beta-propiolactone from the polymerized beta-propiolactone.

2. The process of claim 1 wherein the monomeric beta-propiolactone is subjected to a high energy electron dosage of from about 0.01 to about 10 megarads.

3. The process of claim 2 wherein the electron dosage is delivered at a dosage rate of from about $1.6 \times 10^{-4}$ megarads per minute to about 20 megarads per minute.

4. The process of claim 1 wherein the unpolymerized beta-propiolactone is removed from the polymer below the thermo-polymerization temperature of beta-propiolactone by filtration.

References Cited in the file of this patent

UNITED STATES PATENTS

| | | |
|---|---|---|
| 2,361,036 | Kung | Oct. 24, 1944 |
| 2,853,474 | Reynolds et al. | Sept. 23, 1958 |
| 2,878,236 | Young et al. | Mar. 17, 1959 |
| 2,959,531 | Wheelock | Nov. 8, 1960 |
| 2,964,454 | Findley | Dec. 13, 1960 |

OTHER REFERENCES

Ballatine et al.: Brookhaven National Laboratory Report 317, October 1954, pages 1–7.